United States Patent
Jie et al.

(10) Patent No.: US 6,597,835 B2
(45) Date of Patent: Jul. 22, 2003

(54) LENSED OPTICAL FIBER HAVING HIGH COUPLING EFFICIENCY, PROCESS OF PRODUCTION AND APPARATUS FOR PRODUCTION OF SAME, AND LASER DIODE MODULE

(75) Inventors: Xu Jie, Ichihara (JP); Kenji Suzuki, Chiba (JP); Takayuki Andou, Ichihara (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 09/736,551

(22) Filed: Dec. 13, 2000

(65) Prior Publication Data

US 2002/0031300 A1 Mar. 14, 2002

(30) Foreign Application Priority Data

Dec. 17, 1999 (JP) .............................. 11-359117
Dec. 7, 2000 (JP) ....................... 2000-373150

(51) Int. Cl.⁷ .............................. G02B 6/32; G02B 6/42
(52) U.S. Cl. ............................................. 385/33; 385/88
(58) Field of Search ............................ 385/33, 31, 34, 385/88

(56) References Cited

U.S. PATENT DOCUMENTS

| 3,910,677 A | 10/1975 | Becker et al. ............. 350/96 C |
| 4,766,705 A | 8/1988 | Dholakia ................... 51/328 |
| 4,812,002 A | 3/1989 | Kato et al. ................ 350/96.18 |
| 5,071,217 A | * 12/1991 | Birch ............................. 385/33 |
| 5,101,457 A | * 3/1992 | Blonder et al. ................ 385/33 |
| 5,901,261 A | * 5/1999 | Wach ............................. 385/38 |
| 6,094,515 A | * 7/2000 | Miki et al. ..................... 385/31 |
| 6,137,938 A | * 10/2000 | Korn et al. ................... 385/123 |
| 6,301,406 B1 | 10/2001 | Irie et al. ....................... 385/33 |
| 6,304,688 B1 | 10/2001 | Korn et al. .................... 385/15 |
| 6,317,550 B2 | 11/2001 | Irie et al. ..................... 385/123 |

FOREIGN PATENT DOCUMENTS

| EP | 0 294 650 A | 12/1988 |
| EP | 0 802 433 A | 10/1997 |
| EP | 0 916 976 A | 5/1999 |
| JP | 57150810 A | * 9/1982 |

OTHER PUBLICATIONS

Patent Abstracts of Japan, vol. 1999, No. 09, Jul. 30, 1999 & JP 11 109177 A (Mitsubishi Chemical Corp), Apr. 23, 1999.

* cited by examiner

*Primary Examiner*—Michael C. Zarroli
(74) *Attorney, Agent, or Firm*—Frishauf, Holtz, Goodman & Chick, P.C.

(57) ABSTRACT

A lensed optical fiber comprised of an optical fiber having a core and a cladding and a lens portion formed at its front end, a process of production of a lensed optical fiber, an apparatus for its production, and a laser diode module. The lens portion of the lensed optical fiber is comprised of a substantially flat portion formed at an end face of the core, slanting faces formed at an end face of the cladding, and convex curved faces including part of the core between the substantially flat portion and slanting faces.

19 Claims, 11 Drawing Sheets

LENSED OPTICAL FIBER HAVING HIGH COUPLING EFFICIENCY, PROCESS OF PRODUCTION AND APPARATUS FOR PRODUCTION OF SAME, AND LASER DIODE MODULE

BACKGROUND OF THE INVENTION

1. Field of the Invention

The present invention relates to a lensed optical fiber, a process for production and apparatus for production of the same, and a laser diode module.

2. Description of the Related Art

Among laser diode modules, there are types which input light emitted from a laser diode into an optical fiber.

As a lensed optical fiber used for such a laser diode module, for example, there is known an optical fiber with an entire front end formed into a convex lens shape (see U.S. Pat. No. 3,910,677).

A laser diode module comprised of such a lensed optical fiber and laser diode optically coupled together is used for example as the excitation light source of an erbium doped fiber amplifier (EDFA) or Raman amplifier.

A laser diode module able to be used as such an excitation light source is required to give an extremely high light output compared with a communications use light source. This requirement is being increasingly severe with each passing year such as from at least 100 mW to at least 200 mW, at least 300 mW, etc.

In such a conventional laser diode module using a lensed optical fiber, however, the ratio of the amount of light input to the lensed optical fiber in the entire output of light from the laser diode, that is, the coupling efficiency of the laser diode and lensed optical fiber, is only about 80 percent. It has been difficult to achieve a coupling efficiency higher than that. Therefore, in conventional laser diode modules using lensed optical fibers, it has been difficult to obtain a high light output.

SUMMARY OF THE INVENTION

An object of the present invention is to provide a lensed optical fiber superior in coupling efficiency with a laser diode, a process of production and apparatus for production of the same, and a laser diode module.

According to a first aspect of the present invention, there is provided a lensed optical fiber comprised of an optical fiber having a core and a cladding and a lens portion formed on its front end, the lens portion having a substantially flat portion formed at an end face of the core, slanting faces formed at an end face of the cladding, and convex curved faces including part of the core formed between the substantially flat portion and slanting faces.

As one example, the lens portion is formed shaped as a wedge.

As another example, the lens portion is formed shaped as a cone with a top cut away.

Preferably, a width or diameter of the substantially flat portion is 0.2 to 0.6 time a core diameter.

Preferably, a width or diameter of the substantially flat portion is at least 1 μm.

Preferably, the substantially flat portion has an average radius of curvature of at least 10 times the radii of curvature of the convex curved faces.

Preferably, a center portion of the substantially flat portion is comprised of a planar portion not formed into a curved face.

Preferably, a width or diameter of the planar portion is at least 0.5 time a diameter or width of the substantially flat portion.

Preferably, the planar portion is a mirror face formed by cleavage.

According to a second aspect of the present invention, there is provided a process of production of a lensed optical fiber comprising a step A of forming a planar portion substantially perpendicular to a core center axis at a front end of an optical fiber, a step B of forming slanting faces around the planar portion, and a step C of processing ridge portions of the planar portion and the slanting faces to form convex curved faces and finishing the planar portion to a substantially flat portion.

Preferably, step A is a step of cleaving the optical fiber to form a planar portion comprised of a cleaved face.

Preferably, step A is a step of polishing an end face of the optical fiber to form a planar portion.

Preferably, step B is a step of forming the slanting faces so that widths δ1 and δ2 between the core and the ridges of the slanting faces at the planar portion become ⅓ to 3 times a diameter Dcr of the core.

Preferably, step B is a step of forming two slanting faces at the two sides of the planar portion.

Preferably, step B is a step of polishing the optical fiber while turning it about a core center axis.

Preferably, the process further comprises temporarily holding a plurality of optical fibers by inserting them into a holder formed with a row of a plurality of optical fiber holes and processing the plurality of optical fibers all together by at least one of the step A, step B, and step C.

Preferably, the process further comprises temporarily holding a plurality of optical fibers by inserting them into a holder formed with a row of a plurality of optical fiber holes, processing them all together by the step A and step B, then processing the plurality of optical fibers one by one by step C.

Preferably, the process further comprises temporarily holding a plurality of optical fibers by inserting them into a holder formed with a row of a plurality of optical fiber holes and polishing the plurality of optical fibers together with the holder by at least one of the step A, step B, and step C.

Preferably, the step B and/or step C is a step of running a polishing tape and bringing the polishing tape into contact with a desired processing portion of the optical fiber.

Preferably, step C is a step of running a polishing tape abutting at its back against a back member having a groove and bringing the polishing tape into contact with ridge portions between the planar portion and slanting faces of the optical fiber.

According to a third aspect of the present invention, there is provide an apparatus for production of a lensed optical fiber, comprising a holder for holding an optical fiber, a polishing tape, a drive mechanism for running the polishing tape, and a back member having an abutting face for abutting against a back surface of the polishing tape.

Preferably, the polishing tape is arranged at the two sides of the holder.

Preferably, the back member is provided with a groove in its abutting surface.

According to a fourth aspect of the present invention, there is provided a laser diode module comprising a laser diode and a lensed optical fiber optically coupled with the laser diode.

Figure 18:
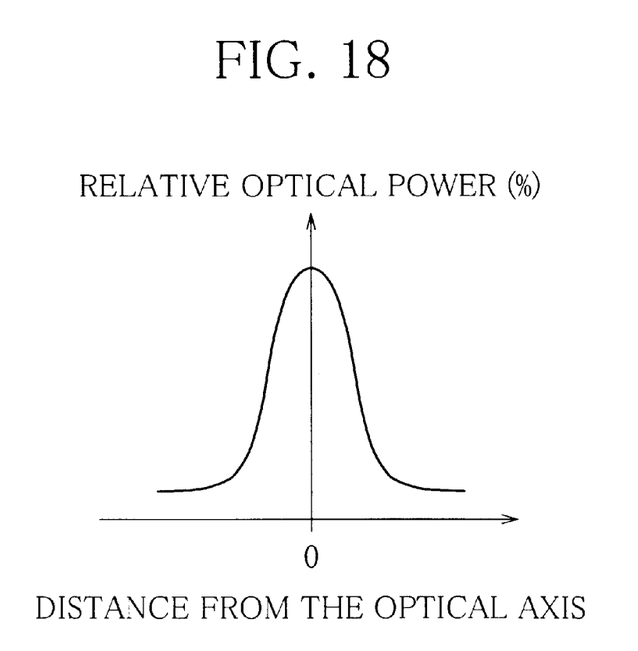
FIG. 18 is a graph of the distribution of relative intensity of light emitted from the laser diode in a direction perpendicular to the optical axis.

The light emitted from the laser diode, as shown in FIG. 18, is strongest at the portion of the optical axis.

The lensed optical fiber of the present invention has a substantially flat portion formed at its front end, so can receive this strongest light efficiently. Further, the lensed optical fiber of the present invention has convex curved faces formed between the substantially flat portion and slanting faces and is therefore raised in lens effect.

Therefore, according to the lensed optical fiber of the present invention, it is possible to receive light emitted from the laser diode with an extremely high coupling efficiency.

These and other objects, features, and advantages of the present invention will become clearer from the following detailed description of the preferred embodiments given with reference to the attached drawings.

BRIEF DESCRIPTION OF THE DRAWINGS

FIG. 13A explains the process of production of the wedge-shaped end of an optical fiber of FIG. 12 and is a side view of the state with a plurality of optical fibers temporarily held in a holder, while

FIG. 14A is a side view of the state of grinding into a trapezoidal shape a holder temporarily holding a plurality of optical fibers by a first processing step, while

FIG. 15A is a side view of the state of finely polishing the holder shown in FIG. 14A, 14B by a first processing step, while

FIG. 16A is a side view showing enlarged the state of the two sides of the front end of the holder of FIG. 15A polished into curved faces of predetermined radii of curvature by a second processing step, while

DESCRIPTION OF THE PREFERRED EMBODIMENTS

Next, a lensed optical fiber according to a first embodiment of the present invention, here an example of a wedge-shaped end optical fiber, and a process of production and apparatus for production of the same will be explained in detail based on FIG. 1 to FIG. 11.

Figure 1:
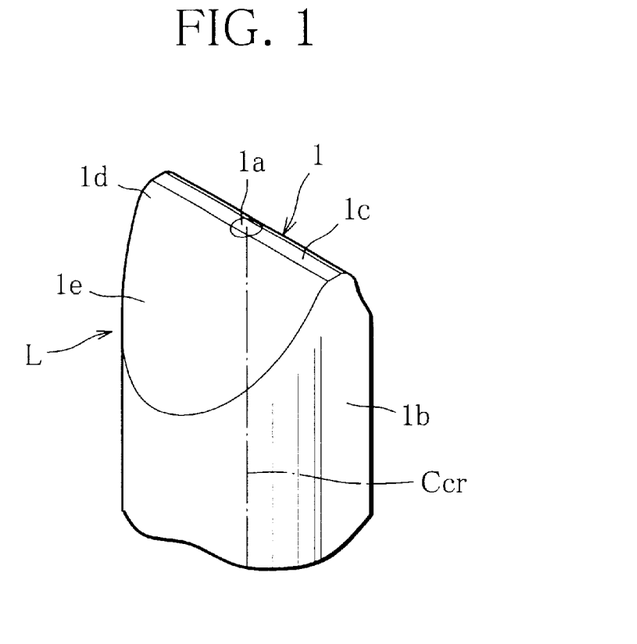
FIG. 1 is a perspective view of a wedge-shaped end of an optical fiber according to a first embodiment of the present invention.
Figure 2:
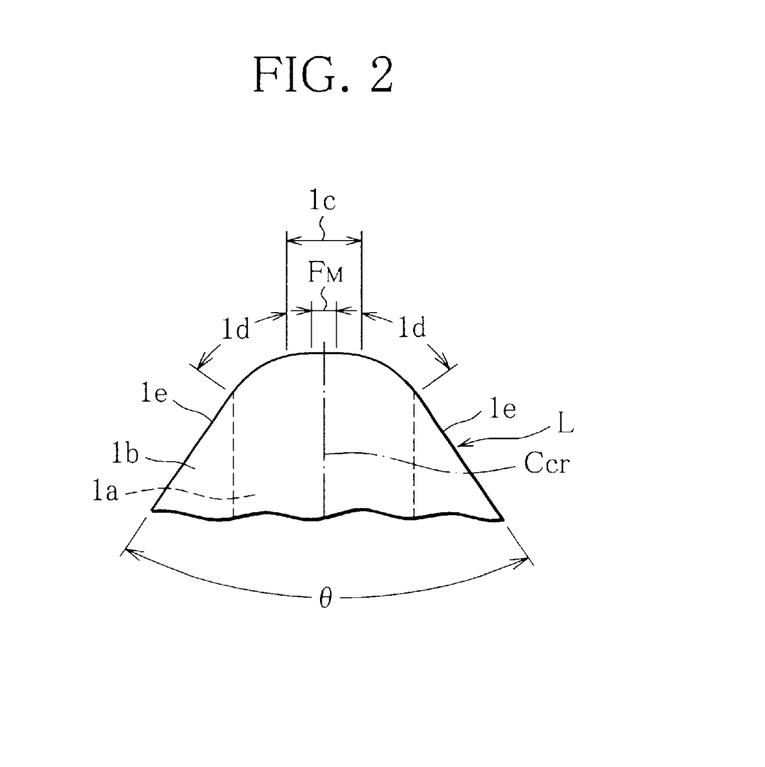
FIG. 2 is a side view of the wedge-shaped end of the optical fiber of FIG. 1.

The wedge-shaped end optical fiber 1 is, as shown in FIG. 1 and FIG. 2, a silica glass optical fiber of a diameter of 125 μm comprised of a core 1a of a diameter of 6 μm and a cladding 1b surrounding the outside of the core.

The wedge-shaped end optical fiber 1 is processed to form a wedge shaped lens portion L at its front end.

The lens portion L is comprised of a substantially flat portion 1c, slanting faces 1e, and convex curved faces 1d formed between the substantially flat portion 1c and slanting faces 1e.

The substantially flat portion 1c is formed to include the end face of the core 1a and is formed to a width of at least 1 μm (length in left-right direction in FIG. 2) in a substantially planar shape perpendicular to the core center axis Ccr.

More particularly, the substantially flat portion 1c, as shown in FIG. 2, is comprised of a center portion formed into a mirror face FM by cleavage by a fiber cutter and of remaining portions formed by polished faces with large radii of curvature. Due to this, the overall substantially flat portion 1c is formed into a planar shape with a large radius of curvature.

Further, the slanting faces 1e are formed by polishing the two sides of the substantially flat portion 1c symmetrically with respect to the core center axis Ccr. The slanting faces 1e are mainly faces from which the front end of the cladding 1b is exposed, but may be formed reaching part of the core 1a as well.

The convex curved faces 1d are formed from the front end of the core 1a by polishing between the substantially flat portion 1c and the slanting faces 1e. Compared with the substantially flat portion 1c, they have extremely small radii of curvature.

As one example, the wedge-shaped end optical fiber 1 is formed with a width of the substantially flat portion 1c of 2.4 μm or 0.4 time the diameter of the core 1a and formed with a width of the mirror face FM of 1.2 μm or half of the width of the flat portion 1c. The average radius of curvature of the substantially flat portion 1c is extremely large due to the mirror face FM. The convex curved faces 1d are formed with radii of curvature of 5 μm. The angle θ formed by the two slanting faces 1e is 80°.

The wedge-shaped optical fiber 1 receives the strongest portion of light in the distribution of intensity at the substantially flat portion 1c. The mirror face FM of the substantially flat portion 1c is comprised of a cleaved face of the optical fiber, so is not formed on the surface with the affected layer characteristic of a polished face. Further, the convex curved faces 1d around the mirror face FM can be finely polished using a cerium oxide or other polishing tape etc. causing a mechanochemical reaction on the silica at the time of polishing so as to remove almost all of the affected layer.

The affected layer means a layer where a refractive index has changed from a predetermined value due to damage due to the polishing and becomes a cause of reduction of the optical coupling efficiency due to surface reflection at the lens portion L.

The wedge-shaped end optical fiber 1 of the present embodiment is improved in the optical coupling efficiency by making the center portion of the lens portion L receiving the light, that is, the portion receiving the particularly strong light, the mirror face FM free from the affected layer.

Further, the wedge-shaped end optical fiber 1 can be given a high lens effect by the formation of the convex curved faces 1d, light can be sufficiently pulled into the core 1a, and the optical coupling efficiency can therefore be improved.

Therefore, the wedge-shaped end optical fiber 1 can be improved further in the optical coupling efficiency by setting the width of the mirror face FM to be at least 0.5 time the width of the substantially flat portion 1c.

Further, the wedge-shaped end optical fiber 1 can be given a suitable flatness at the substantially flat portion 1c and can be given a suitable lens effect at the convex curved faces 1d as well by setting the average radius of curvature of the substantially flat portion 1c to more than at least 10 times the radii of curvature of the convex curved faces 1d.

The wedge-shaped end optical fiber 1 having this characteristic may be produced using optical fibers of all different types of compositions such as a silica based optical fiber mainly comprised of $SiO_2$, a $SiO_2$—$Na_2O$—$CaO$ based, $SiO_2$—$B_2O_3$—$_{Na2}O$ based, alkali free $Ga_2O_2$—$GeO_2$—$P_2O_5$ based, or other multi-composition based optical fiber, or a fluoride-based optical fiber.

A wedge-shaped end optical fiber 1 having such a shape is produced using the production apparatus explained below.

Figure 4:
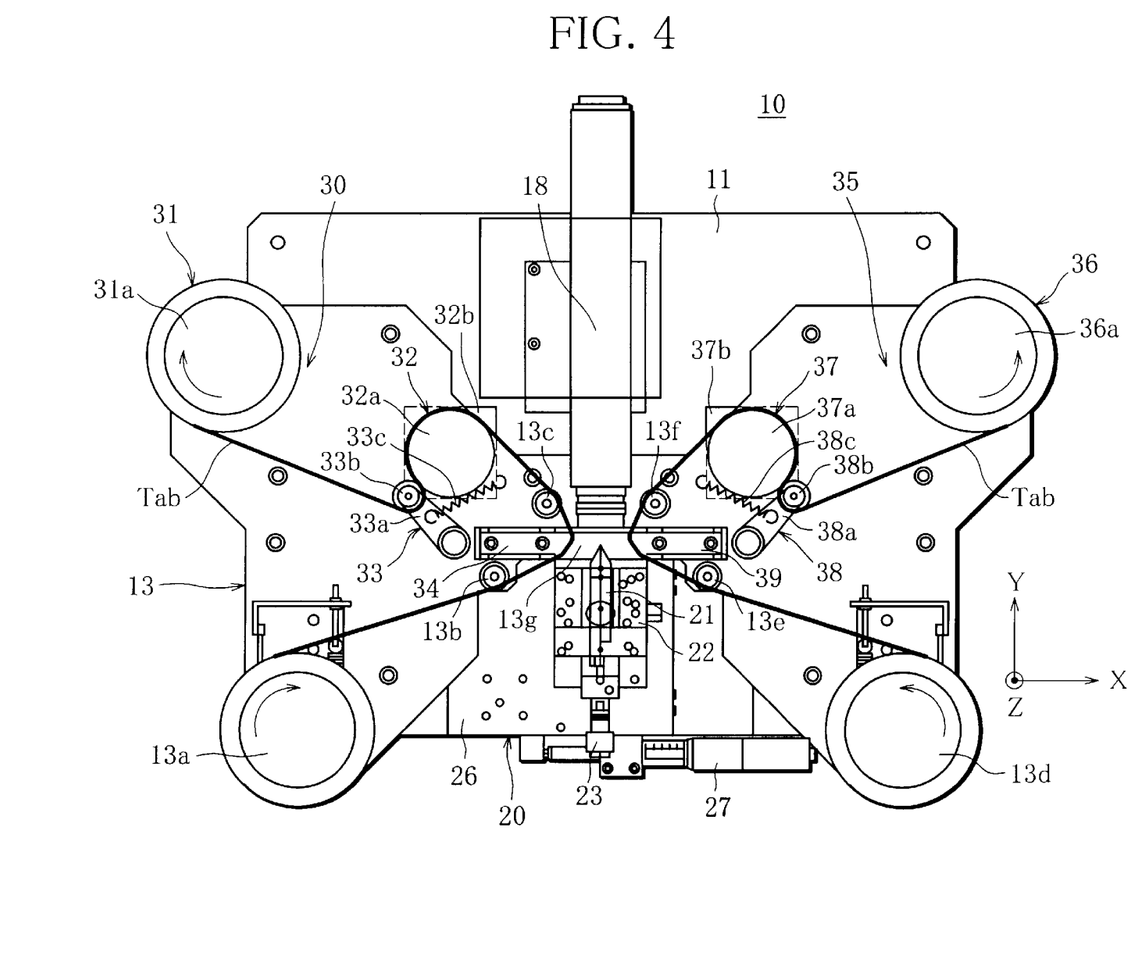
FIG. 4 is a plane view of an apparatus for production of the wedge-shaped end of the optical fiber of FIG. 1.
Figure 5:
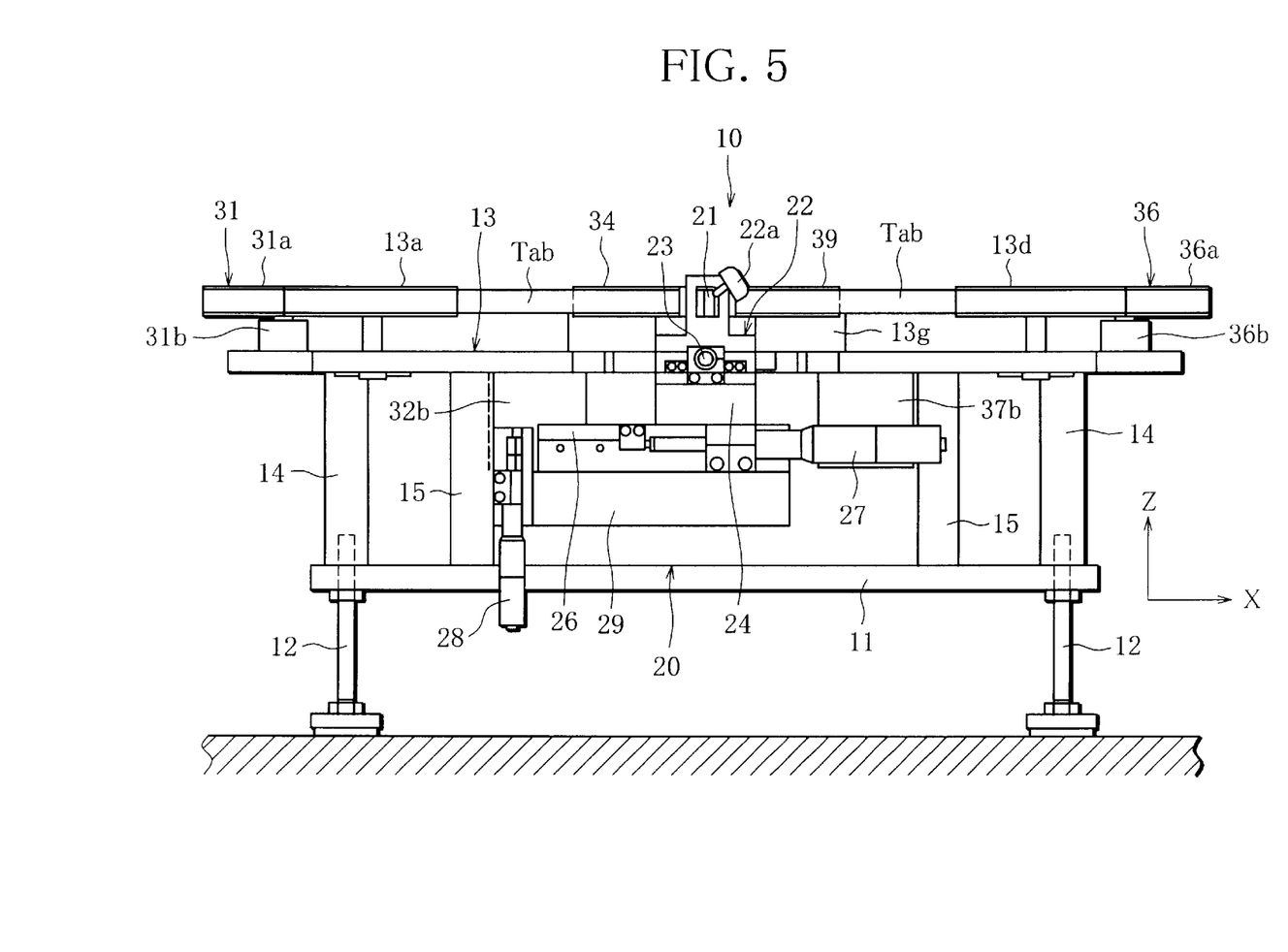
FIG. 5 is a front view of the production apparatus of FIG. 4.

The production apparatus 10, as shown in FIG. 4 and FIG. 5, is provided with a holding unit 20 serving as the holder and a first processing unit 30 and second processing unit 35.

The holding unit 20 is mounted on a first support base 11, holds the optical fiber Fb, and moves in the direction of three axes of an arrow Y parallel to the core center axis Ccr (see FIG. 6) and arrows X and Z perpendicular to this (see FIGS. 4 and 5). The holding unit 20 is provided with a fiber chuck 21, a first slide table 22, a Y-axis adjuster 23, a second slide table 26, an X-axis adjuster 27, and a Z-axis adjuster 28. Here, the first support base 11 is supported at its four corners by four legs 12. A monitor 18 is provided at a position facing the holding unit 20.

The monitor 18 is a camera provided with the function of a microscope which measures the polishing conditions such as the width or shape of the portion of the wedge shape formed on the front end of the optical fiber Fb by the first processing unit 30 and second processing unit 35 and judges the quality of the polishing.

Figure 6:
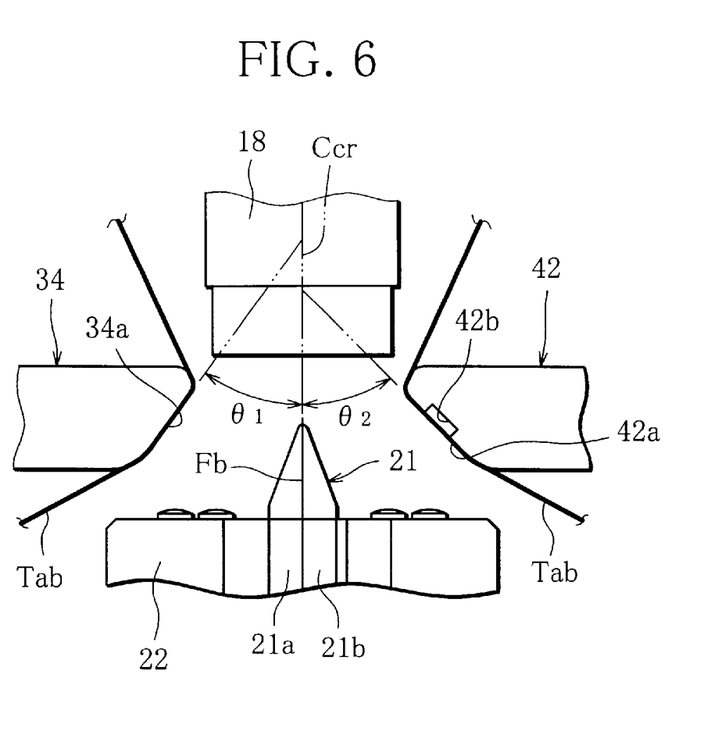
FIG. 6 is an enlarged view of main parts for explaining an angle formed between a core center axis of an optical fiber held in a holding unit and a taper of a back member in the production apparatus of FIG. 4.

The fiber chuck 21, as shown in FIG. 4 and FIG. 6, has two holding plates 21a and 21b (see FIG. 6) and is formed with a V-groove (not shown) for positioning and holding the optical fiber Fb at the center of one of the facing surfaces. The first slide table 22 is a table sliding in the Y-axis direction and can detachably secure the fiber chuck 21 to it by screws 22a. The first slide table 22 is driven in the Y-axial direction illustrated in the figure by a Y-axis adjuster 23. The Y-axis adjuster 23 is a means provided with a micrometer for adjusting the position of the first slide table 22 in the Y-axial direction. It can finely adjust the position in units of 0.1 μm at the smallest. The X-axis adjuster 27 and the Z-axis adjuster 28 also have the same precisions of positional adjustment as the Y-axis adjuster 23. Further, the Y-axis adjuster 23 is used for moving the first slide table 22 in the Y-axial direction for focusing when observing the front end of the optical fiber Fb by the monitor 18.

The second slide table 26 is a slide member able to slide in the X-axial direction and is driven by the X-axis adjuster 27 to move in the X-axial direction. The third slide table 29 is driven by the Z-axis adjuster 28 to move in the Z-axial direction together with the second slide table 26.

The first and second processing units 30 and 35 are units for processing the front end of the optical fiber Fb held by the holding unit 20 into a wedge shape and are provided on a second support base 13. The second support base 13, as shown in FIG. 5, is supported by four support columns 14 and 15 provided at the first support base 11.

The first processing unit 30, as shown in FIG. 4, is provided with a polishing tape Tab, a takeup reel 31, a transport roller 32, a pressing member 33, and a back member 34.

Here, the second processing unit 35 is provided with a polishing tape Tab, a takeup reel 36, a transport roller 37, a pressing member 38, and a back member 39 and has the same structure and action as the first processing unit 30. Therefore, the first processing unit 30 will be explained, while corresponding reference numerals will be used for corresponding portions of the second processing unit 35 in the following explanation and FIG. 4 to FIG. 6 and overlapping explanations omitted.

The takeup reel 31 is provided with a reel 31a for taking up the polishing tape Tab fed out from a feed reel 13a and a motor 31b for turning the reel 31a. The motor 31b is provided on the second support base 13. The feed reel 13a is rotatably supported on the second support base 13.

Here, the first processing unit 30 feeds out the polishing tape Tab from the feed reel 13c, passes it through the guide roller 13b, the back member 34, the guide roller 13c, the transport roller 32, and the pressing member 33, and takes it up at the takeup reel 31. On the other hand, the second processing unit 35 feeds out the polishing table Tab from the feed reel 13d, then passes it through the guide roller 13e, back member 39, guide roller 13c, transport roller 37, and pressing member 38, and takes it up at the takeup reel 36.

The transport roller 32 is provided with a roller 32a and a drive motor 32b provided at the second support base 13 for driving the rotation of the roller 32a.

The pressing member 33 is provided with a swing arm 33a, a pressing roller 33b provided at the end of the swing arm 33a, and a spring 33c. The pressing roller 33b is pressed against the roller 32a by a predetermined pressing force by the spring 33c engaged at one end to the second support base 13 and the other end at the swing arm 33a. Due to this, the polishing tape Tab is transported by a predetermined speed by the transport roller 32 and the pressing member 33.

The back member 34 is made of stainless steel or another material, abuts against the polishing tape Tab from the back, and therefore polishes the optical fiber Fb held by the holding unit 20 to a wedge shape. The back member 34, as shown in FIG. 6, is formed at the front end facing the optical fiber Fb with an abutting face 34a which is tapered and abuts against the back of the polishing tape Tab. The back member 34, as shown in FIG. 4 and FIG. 5, is attached to a support block 13g of the second support base 13.

The production apparatus 10 is comprised as explained above. The wedge-shaped end optical fiber 1 is produced by the process of production explained below.

(Step A)

First, the front end of a silica glass optical fiber of a diameter of 125 μm comprised of a core of a diameter of 6 μm and a cladding surrounding the outside of the same is cleaved by a fiber cutter to form a planar portion PPL (see FIG. 3C) substantially perpendicular to the core center axis Ccr.

Figure 3A:
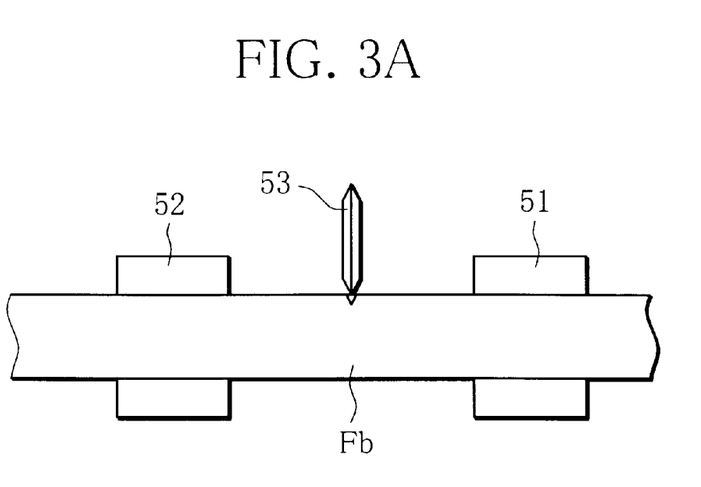
FIG. 3A is a side view of a step of cleaving an optical fiber and shows a step of forming a cut in the optical fiber.
Figure 3B:
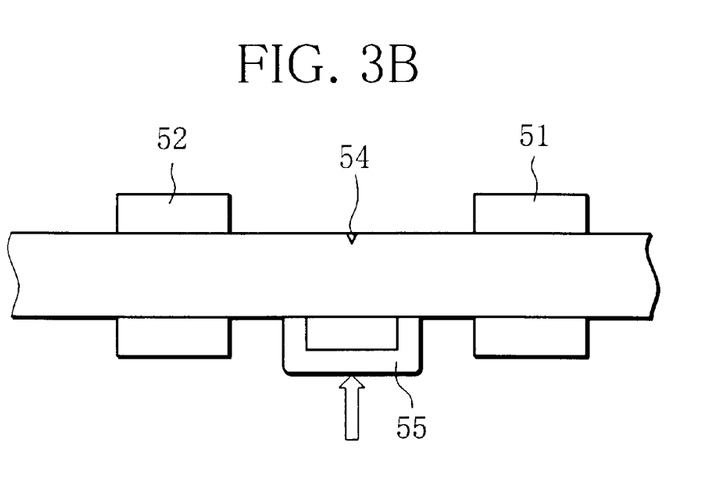
FIG. 3B is a side view of a step of cleaving the optical fiber.
Figure 3C:
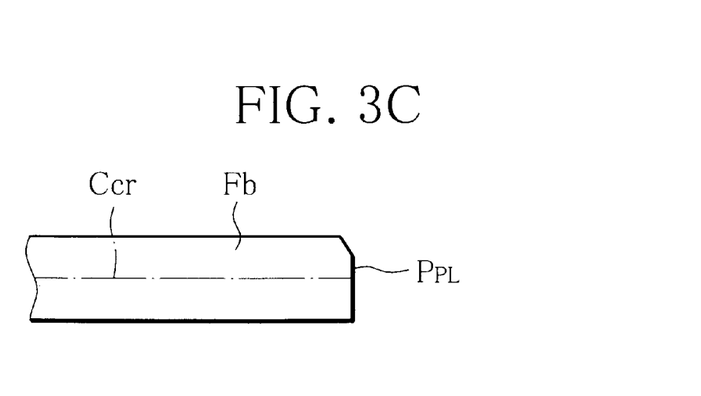
FIG. 3C is a side view of an optical fiber after being cleaved.

That is, as shown in FIG. 3A, first, the optical fiber Fb is fixed at predetermined intervals in the longitudinal direction by a fiber holders 51 and 52 and given a notch 54 at the side face of the optical fiber Fb by a circular blade 53. Next, as shown in FIG. 3B, the optical fiber Fb is pushed up by a fixture 55 from the side opposite to the notch 54 to cause a tensile stress at the optical fiber Fb and cleave it. When cleaved in this way, the optical fiber Fb, as shown in FIG. 3C, is formed at the end with a planar portion PPL substantially perpendicular to the core center axis Ccr and comprising a mirror face.

(Step B)

Next, the optical fiber Fb is positioned in the V-groove with the planar portion PPL projecting out and held by the two holding plates 21a and 21b. In that state, the fiber chuck 21 is screwed to the first slide table 22.

Next, the X-axis adjuster 23, Y-axis adjuster 27, and Z-axis adjuster 28 of the holding unit 20 are used, as shown in FIG. 4, to finely adjust the optical fiber Fb to face the monitor 18 and be positioned corresponding to the abutting faces 34a and 39a of the left and right back members 34 and 39. This position is the initial position of the holding unit 20 at the time of start of polishing.

Next, the motor 31b and the drive motor 32b are activated to feed out the polishing tape Tab from the feed reel 13a and transport it, as shown in FIG. 4, through the guide roller 13b, back member 34, guide roller 13c, transport roller 32, and pressing member 33 to the takeup reel 31 at a predetermined speed to start the polishing of the optical fiber Fb. The polishing tape Tab used at this time is a tape of a width of 60 mm comprised of a substrate of polyester etc. on which is adhered alumina powder of an average grain size of 3 μm.

Figure 7A:
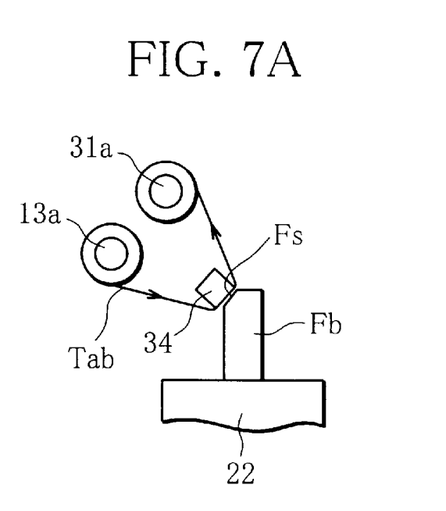
FIG. 7A and FIG. 7B are schematic views of a step for forming slanting faces of an optical fiber in the production apparatus of FIG. 4.

When polishing the end of the optical fiber Fb to a wedge shape, first, the X-axis adjuster 27 is used to make the second slide table 26 move along the X-axis to the left direction of FIG. 4. The position is monitored by the monitor 18, then the front end of the optical fiber Fb is made to abut against the polishing tape Tab at the back member 34 side. One side of the optical fiber Fb is polished as shown in FIG. 7A by the polishing tape Tab transported at the predetermined speed to form a slanting face Fs.

Figure 7B:
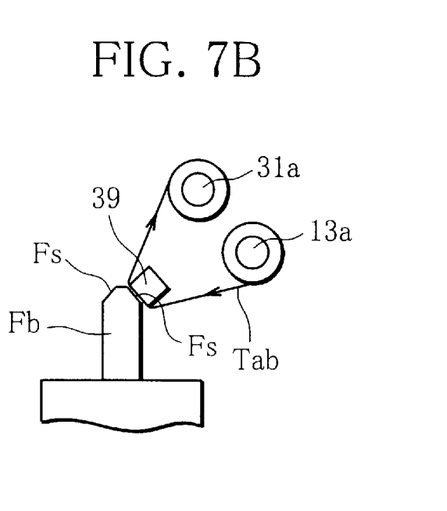
Figure 8:
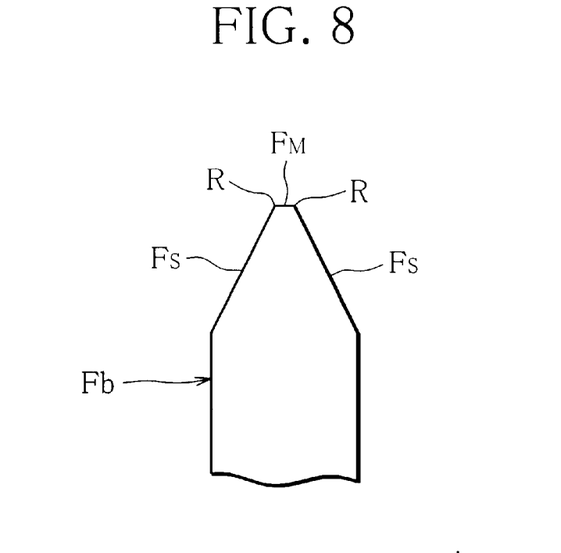
FIG. 8 is a side view of slanting faces of an optical fiber formed by the production apparatus of FIG. 4.

Next, the X-axis adjuster 27 is used to make the second slide table 26 move along the X-axis in the right direction of FIG. 4. The position is monitored by the monitor 18, then the front end of the optical fiber Fb is made to abut against the polishing tape Tab at the back member 39 side. The other side of the optical fiber Fb is polished as shown in FIG. 7B by the polishing tape Tab transported at the predetermined speed to form another slanting face Fs. Due to this, as shown in FIG. 8, the end of optical fiber Fb is processed into a wedge shape having a portion of a width of 10 μm perpendicular to the core center axis Ccr as the mirror face FM and two slanting faces Fs. At this time, angular ridges R are formed between the mirror face FM and the slanting faces Fs of the optical fiber Fb.

At step B, a back member 34 having an angle θ1 of 40 degrees formed between the core center axis Ccr and the taper 34a shown in FIG. 6 is used so that the angle θ formed between the two slanting faces 1e in the wedge-shaped end optical fiber 1 produced (see FIG. 2) becomes 80 degrees.

(Step C)

Figure 9:
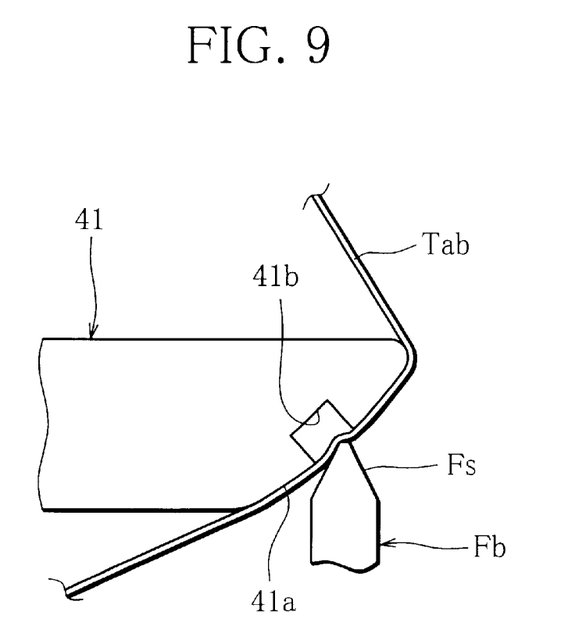
FIG. 9 is an enlarged view of main parts showing a step of forming convex curved faces by the production apparatus of FIG. 4.

Next, as shown in FIG. 6 and FIG. 9, the back members 34 and 39 are changed to back members 41 and 42 formed with grooves 41b and 42b at the abutting surfaces 41a and 42a and having angles θ2 of 45 degrees formed between the abutting surfaces 41a and 42a and the core center axis Ccr. Further, the polishing tape Tab is changed to one of a finer average grain size (here, less than 1 μm). Next, the holding unit 20 is used to polish the front end of the optical fiber Fb, that is, the portion of the ridges R between the mirror face FM and the slanting faces Fs, by an operation similar to the above.

At this time, as shown in FIG. 9, the back member 41 is formed with a groove 41b at its abutting surface 41a. Therefore, by making the portion of the ridge R of the wedge-shaped end optical fiber Fb abut against the surface of the polishing tape Tab corresponding to the groove 41b, the polishing tape Tab becomes depressed as illustrated at the portion of the groove 41b. As a result, the optical fiber Fb is shaped by the depressed polishing tape Tab so that the portion of the ridge R forms a convex curved face.

Therefore, by the production apparatus 10 and process of production of the present invention, a wedge-shaped end optical fiber 1 shown in FIG. 1 having a substantially flat portion 1c perpendicular to the core center axis Ccr and including a partial mirror face and having slanting faces 1e adjoining the substantially flat portion 1c through convex curved faces 1d and therefore a front end shaped as a wedge is formed.

Here, a silica glass fiber of a diameter of 125 μm having a core of a diameter of 6 μm and a cladding surrounding the outside of the same was used to produce wedge-shaped end optical fibers 1 with widths of the substantially flat portions 1c of various widths larger than 0.5 μm and smaller than 3.5 μm by the process of the present invention using the production apparatus 10. These were coupled with 980 nm wavelength laser diodes and the coupling efficiency measured. The results are shown in FIG. 10.

Figure 10:
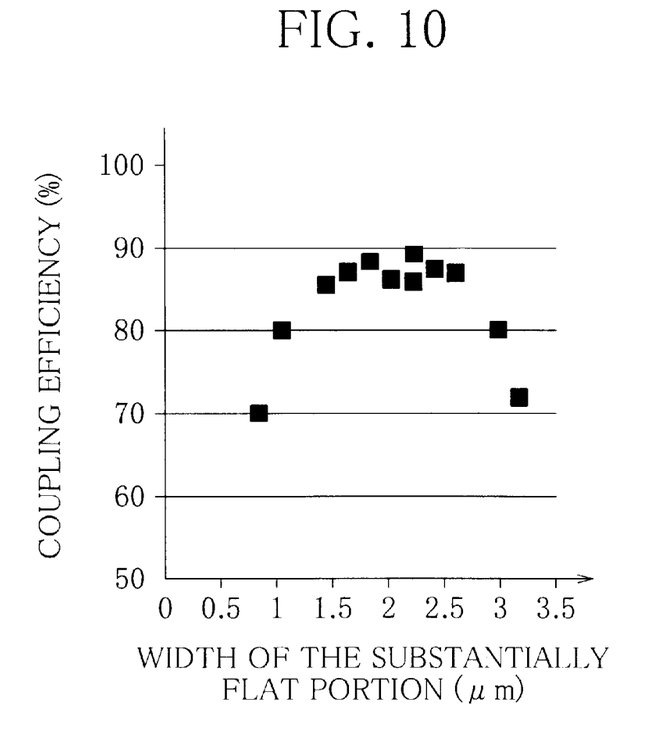
FIG. 10 is a view of results of measurement of a coupling efficiency of a wedge-shaped end optical fiber produced by the production apparatus of FIG. 4 and the width of the substantially flat portion.

As clear from the results shown in FIG. 10, the wedge-shaped end optical fiber 1 gives a high coupling efficiency of over 80 percent if the width of the substantially flat portion 1c is 0.2 to 0.6 time the core diameter. If outside this range, it was learned that the coupling efficiency rapidly fell. Therefore, the wedge-shaped end optical fiber 1 preferably has a width of the substantially flat portion 1c of 0.2 to 0.6 time the core diameter.

Further, while the coupling efficiency was about 80 percent in the conventional lensed optical fiber disclosed in U.S. Pat. No. 3,910,677, the coupling efficiency is increased to 89 percent in a wedge-shaped end optical fiber 1 with a width of the substantially flat portion 1c of 2.2 μm.

Here, if use is made of a fiber chuck 21 having two holding plates extending long in the Z-axial direction and formed at predetermined intervals in the Z-axial direction with a plurality of V-grooves for positioning and holding optical fibers Fb at the center of one of the facing surfaces, it is possible to produce a plurality of wedge-shaped end optical fibers 1.

In this case, at step B, a polishing tape Tab of a wide width of about 60 μm is used to polish a plurality of optical fibers Fb all together, while at step C, the optical fibers Fb are made to move in the Z-axial direction to successively finely polish the optical fibers Fb one at a time. At step C, the polishing tape Tab is preferably made one of a narrower width than step B (for example, a width of about 6 mm) so as not to interfere with the adjoining optical fiber Fb when polishing a predetermined optical fiber Fb.

The wedge-shaped end optical fibers 1 produced in this way are suitable for receiving light having a mode field of an elliptical sectional shape.

Figure 11:
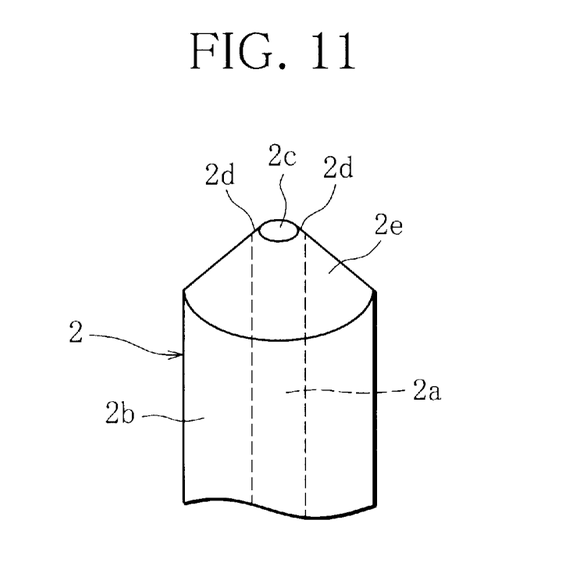
FIG. 11 is a perspective view of an example of another lensed optical fiber produced by the production apparatus of FIG. 4.

Further, if the production apparatus 10 is configured to enable the holding unit 20 provided with the fiber chuck 21 for holding an optical fiber Fb to rotate about the Y-axis, it is possible to produce a lensed optical fiber 2 as shown in FIG. 11 having a core 2a and a cladding 2b surrounding the outside of the core, having part of the substantially flat portion 2c perpendicular to the core center axis Ccr formed by a mirror face, having slanting faces 2e formed through convex curved faces 2d adjoining the substantially flat portion 2c, and therefore shaped as a cone with the top cut away.

Such a lensed optical fiber 2 is suitable for receiving light having a mode field of a circular sectional shape.

In this way, the lensed optical fiber of the present invention can be formed into suitable lens shape for the shape of the mode field of the light emitted from the laser diode.

Next, a lensed optical fiber and process of production of the same according to a second embodiment of the present invention will be explained with reference to FIG. 12 to FIGS. 16A and 16B.

First, the wedge-shaped end optical fiber of this embodiment will be explained based on FIG. 12.

Figure 12:
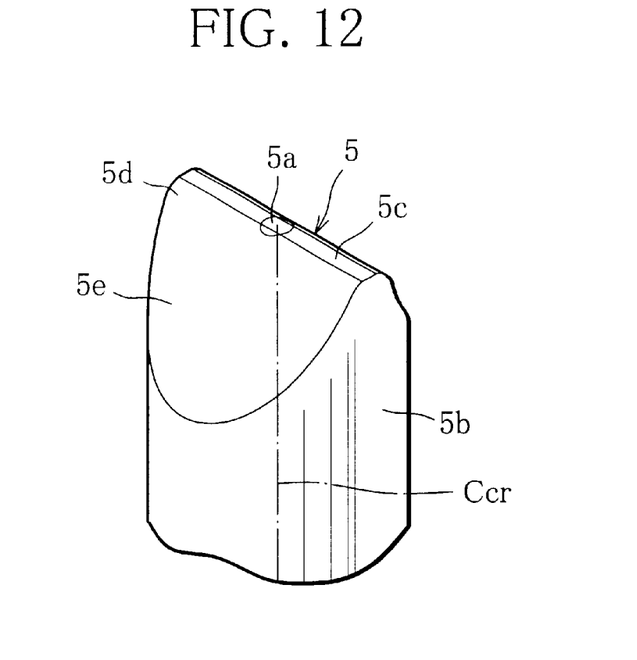
FIG. 12 is a perspective view of a wedge-shaped end of an optical fiber produced by a process of production according to a second embodiment of the present invention.

The wedge-shaped end optical fiber 5, as shown in FIG. 12, is a silica glass optical fiber having a core 5a and a cladding 5b surrounding the outside of the core and has a front end formed into a wedge shape by slanting faces 5e formed via convex curved faces 5d at the two sides of a substantially flat portion 5c. At this time, in the wedge-shaped end optical fiber 5, parts of the outer circumference of the core 5a are polished, a flat portion 5c is formed in the diametrical direction having a width of at least 1 μm at the core center axis Ccr, and this is connected to the slanting faces 5e through the convex curved faces 5d.

The wedge-shaped end optical fiber 5 is different from the wedge-shaped end optical fiber 1 in that all of the substantially flat portion 5c is formed by a polished face.

The wedge-shaped end optical fiber 5 having this shape is produced by for example the process explained below.

Figure 13A:
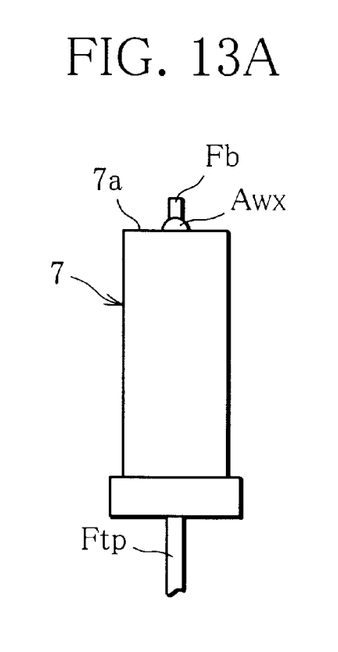
Figure 13B:
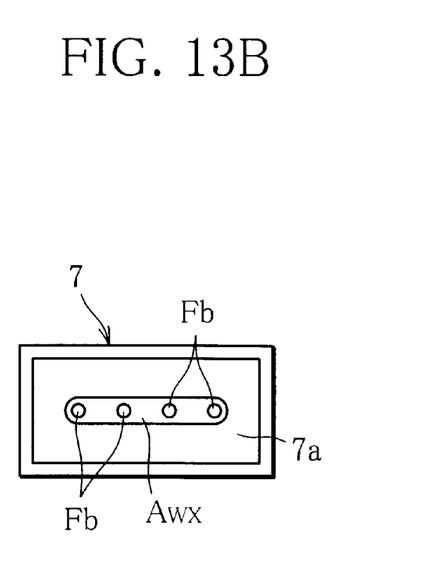
FIG. 13B is a plan view of the same.

First, as shown in FIG. 13A and FIG. 13B, a plurality of optical fibers Fb are inserted into a plurality of optical fiber holes (not shown) of a holder 7 so that the front ends project out slightly from the end face 5a. These are then temporarily secured by a wax adhesive Awx.

As the plurality of optical fibers Fb, use is made of a plurality of optical fibers made of silica glass fibers formed into a tape, that is, a tape fiber Ftp, from which the jackets on the front end portions have been removed to separate the individual optical fibers Fb. Further, as the holder 7, use is made of a multi-fiber connector ferrule with a plurality of optical fiber holes formed in a single row at a high precision.

(Step A)

Next, the holder 7 is subjected to the first processing. In this processing step, the plurality of optical fibers Fb and the holder 7 are ground flat by for example a diamond grindstone of a 10 μm average grain size so that the end face perpendicular to the axes of the optical fibers Fb becomes flat. The wax adhesive Awx at the end face is also removed.

(Step B)

Figure 14A:
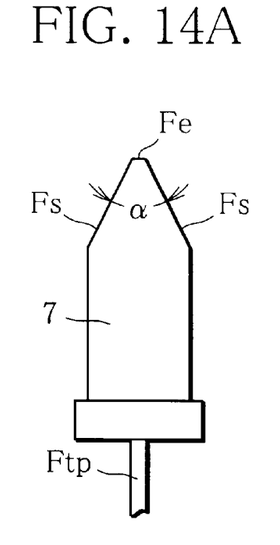
Figure 14B:
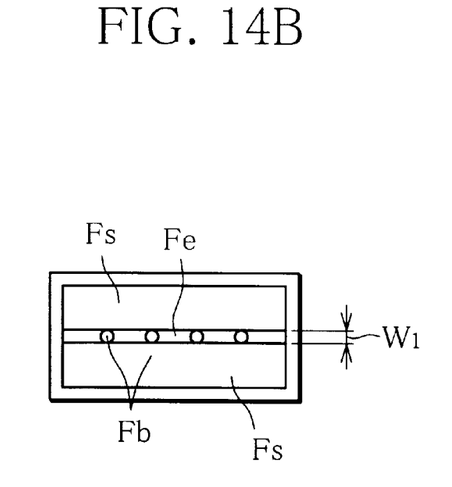
FIG. 14B is a plan view of the same.

Next, in the same way, the holder 7 is ground so that the shape of the front end in the width direction perpendicular to the direction of arrangement of the optical fibers Fb becomes, as shown in FIG. 14A and FIG. 14B, a trapezoidal shape having a planar face Fe perpendicular to the optical axes of the optical fibers Fb (that is, the core center axes Ccr) and containing all of the end faces of the cores CR of the optical fibers Fb and slanting faces Fs formed at the two sides of the planar face Fe and symmetrical with respect to the planar face Fe.

At this time, when the optical fibers Fb are for example single mode fibers of core diameters of about 6 μm, the two slanting faces Fs of the holder are polished symmetrically with respect to the optical axes of the optical fibers Fb so that the width W1 of the planar face Fe becomes about 80 μm and the angle α formed by the two slanting faces Fs becomes about 55 degrees. The holder 7 can prevent polishing loss reaching the cores CR of the optical fibers by leaving a width W1 of the planar face Fe of about 80 μm.

Figure 15A:
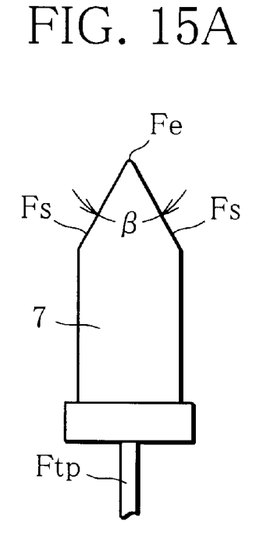
Figure 15B:
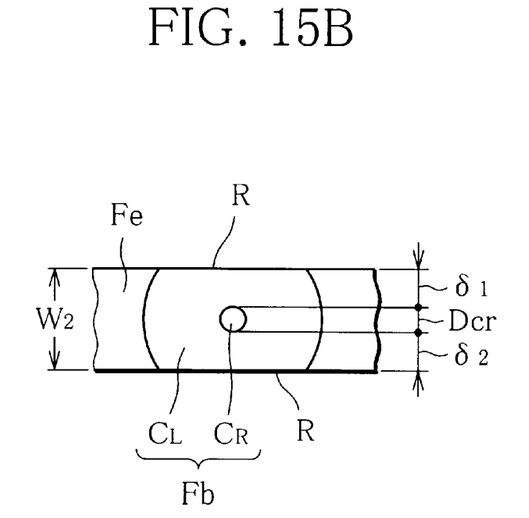
FIG. 15B is a plan view showing enlarged the portion of the optical fiber.

Next, using a grindstone fabricated from an abrasive containing cerium oxide (average grain size of 1 μm), the planar face Fe of the holder 7 is finely polished and the two side faces Fs are finely polished to a predetermined width W2 (μm) shown in FIG. 15B. At this time, the slanting faces Fs of the holder 7 are finely polished so that the planar face Fe has a width in the range of ⅓ to 3 times the core diameter between the outside of the cores CR and the ridges R formed by the planar face Fe and the slanting faces Fs. That is, the two slanting faces Fs of the holder 7 are finely polished symmetrically with respect to the optical axes of the optical fibers Fb so that, as shown in FIG. 15A and FIG. 15B, when the diameter of a core CR is Dcr and the widths between the outside of the cores CR and the ridges R formed by the planar face Fe and the slanting faces Fs are δ1 and δ2 (μm), the width W2 of the planar face Fe becomes as expressed in the following equation and so that the angle β formed by the two slanting faces Fs becomes about 60 degrees:

$$W2=\delta1+\delta2+Dcr$$

For example, when the optical fibers Fb have core diameters of 6 μm, the widths δ1 and δ2 between the outsides of the cores CR and the ridges R formed by the planar face Fe and the slanting faces Fs are preferably equal. It is best that the slanting faces Fs be polished symmetrically with respect to the optical axes of the optical fibers Fb. Further, the widths δ1 and δ2 are set in the following range:

$$2<\delta1, \delta2<15$$

At this time, if the widths δ1 and δ2 become less than 2 μm, it will not be possible to obtain smooth convex curved faces in the later explained second processing step, while if over 15 μm, the radii of curvature of the obtained convex curved faces will become too great and the lens effect in a specific direction aimed at by the wedge-shaped end optical fibers 5 produced will not be able to be exhibited.

Therefore, when set in this way, the width W2 (μm) of the planar face Fe becomes one of the range expressed by the following relationship:

$$10<W2<36$$

By processing in this way, the holder 7, as shown in FIG. 15A and FIG. 15B, is polished to a trapezoidal shape comprised of the planar face Fe having optical fibers Fb temporarily secured partially polished at the cladding CL, having widths between the outsides of the cores CR and the ridges R of δ1 and δ2, and having an overall width of W2 and two slanting faces Fs, thereby completing the first processing step.

In this fine polishing, a grindstone fabricated from an abrasive containing cerium oxide is used as explained above. Therefore, the holder 7 is polished along with the optical fibers Fb to superior flatnesses of the planar face Fe and the two slanting faces Fs by the mechanochemical action and to mirror faces free from the above affected layers.

(Step C)

Figure 16A:
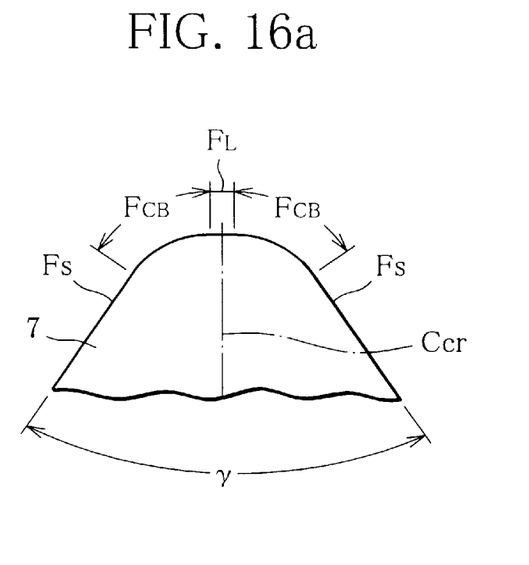
Figure 16B:
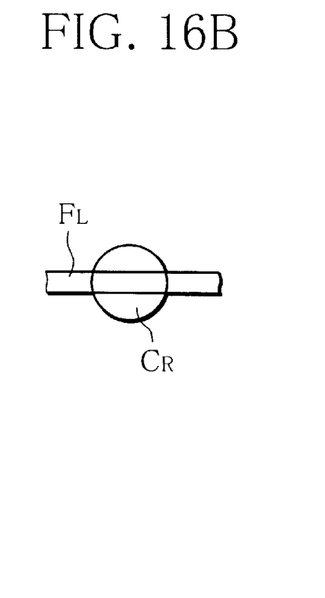
FIG. 16B is a plan view showing enlarged the flat portion and a core portion of the optical fiber.

Next, the holder 7 is subjected to second processing. In this processing step, the portions of the ridges R formed by the planar face Fe and slanting faces Fs of the holder 7 are mainly buffed using an abrasive containing said cerium oxide. At the time of this buffing, the adjacent portions along the ridges R of the planar face Fe and the slanting faces Fs of the holder 7 are also polished. Therefore, the holder 7 is formed at the front end along the centers of the cores CR of the plurality of optical fibers Fb, as shown in FIG. 16A and FIG. 16B, with a substantially flat portion FL having a width of at least 1 μm and convex curved faces FCB connected to the slanting faces Fs at the two sides of the flat portion FL. At the flat portion FL, the optical fibers Fb are polished slightly at the outsides in the width direction of the cores CR (see FIG. 16B).

At this time, in the second processing step, the holder 7 is polished so as to give radii of curvature of the convex curved faces FCB of 3 to 6 μ, more preferably 3.5 to 5.5 μm, in accordance with the characteristics of the laser diode optically coupled with the wedge-shaped end optical fibers 5 produced. Here, the holder 7 is formed with the substantially flat portion FL at its front end by the second processing, but this does not necessarily have to be a planar face. That is, the flat portion FL may be deemed to be a substantially flat portion FL if having a radius of curvature of at least 10 times the radii of curvature of the convex curved faces FCB formed at the two sides. Further, at the time of completion of the processing, the convex curved faces FCB of the holder 7 are, as shown in FIG. 16A, polished symmetrically with respect to the optical axes of the optical fibers Fb so that the angle γ formed by the two slanting faces Fs becomes about 70 degrees.

After the second processing step is finished in this way, the holder 7 is heated to melt the wax adhesive Awx, the plurality of optical fibers Fb are taken out from the plurality of optical fiber holes (not shown), and the deposited wax adhesive Awx is cleaned off, whereby a plurality of wedge-shaped end optical fibers 5 are obtained all at once.

In this way, according to the process of production of the present embodiment, by using the holder 7, it is possible to process a plurality of optical fibers all at once. Further, this process of production finely polishes the ends to planar faces by a grindstone fabricated from an abrasive including cerium oxide in the first processing step and buffs mainly the portions of the ridges R formed by the flat face Fe of the holder 7 and the slanting faces Fs using an abrasive containing cerium oxide in the second processing step. Therefore, the wedge-shaped end optical fiber 5 produced does not have a depressed end face of the core and has a flat portion processed to a mirror face, so has a sufficient optical transmission performance and has an amount of attenuation of reflection, when measured, of at least 55 dB.

Further, when the wedge-shaped end optical fiber of the present invention and the wedge-shaped end optical fiber produced by the process of the prior art were optically coupled with 980 nm wavelength band laser diodes, it was found that the coupling distance could be increased 1.2 to 1.5 times from the prior art and the coupling efficiency could be improved.

Next, an example of a laser diode module of the present invention using a lensed optical fiber of the first and second embodiments will be explained based on FIG. 17.

Figure 17:
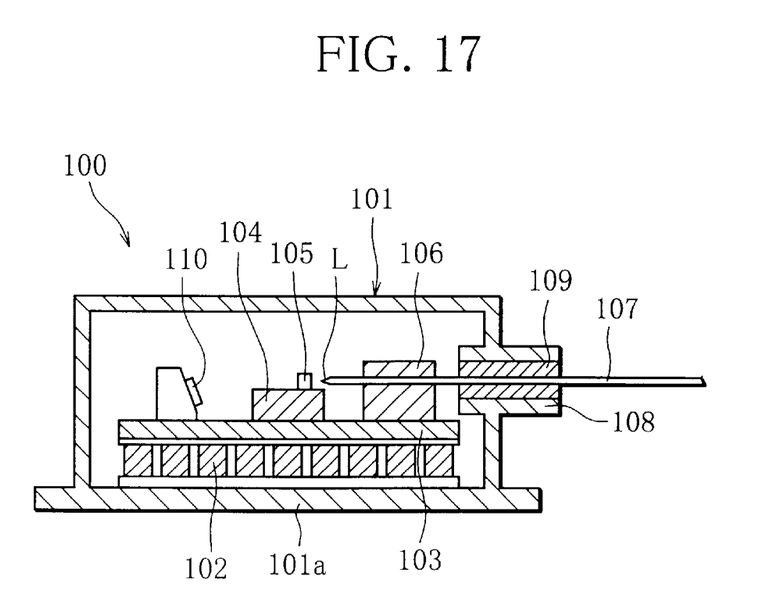
FIG. 17 is a sectional side view of a laser diode module using the lensed optical fiber of the present invention.

As shown in FIG. 17, the laser diode module 100 is comprised of a package 101 with a bottom plate 101a on which are successively arranged a Peltier module 102 for dissipating heat, a base 103, a chip carrier 104, and a laser diode 105. The lensed optical fiber 107 is arranged so that the lens portion L faces the light emitting end face of the laser diode 105 and is affixed on the base 103 through a fiber fixing member 106. The lensed optical fiber 107 is led outside of the package 101 through a sleeve 109 provided in a tubular hole 108.

In this laser diode module 100, when light is emitted from the light emitting end face of the laser diode 105 and inputting the light into the lensed optical fiber 107 through the lens portion L, the lensed optical fiber 107 has an extremely high coupling efficiency of light at the lens portion L as explained by the wedge-shaped end optical fibers 1, 2, and 5 of the first and second embodiments. The laser diode 105, further, has light strongest at the portion of the optical axis as clear from FIG. 18 showing the distribution of relative intensities of light emitted in a direction perpendicular to the optical axis. Therefore, the laser diode module 100 is improved in output from the prior art. In particular, a rare earth element doped fiber type optical amplifier or Raman optical amplifier etc. requires a laser diode module serving as a high output excitation source, so the laser diode module 100 with the high optical coupling efficiency is suitable for use for this.

What is claimed is:

1. A lensed optical fiber comprising an optical fiber having a core and a cladding and a lens portion formed on a front end of the optical fiber, wherein the lens portion has a substantially flat portion formed at an end face of the core, slanting faces formed at an end face of the cladding, and convex curved faces including part of the core formed between the substantially flat portion and the slanting faces, wherein said substantially flat portion has a width and diameter each of which is 0.2 to 0.6 times a core diameter and each of which is at least 1 μm, and wherein said substantially flat portion has an average radius of curvature of at least 10 times a radii of curvature of said convex curved faces.

2. A lensed optical fiber as set forth in claim 1, wherein said lens portion is wedge shaped.

3. A lensed optical fiber as set forth in claim 1, wherein said lens portion is cone shaped with a top cut away.

4. A lensed optical fiber as set forth in claim 2, wherein a center portion of said substantially flat portion comprises a planar portion not formed into a curved face.

5. A lensed optical fiber as set forth in claim 3, wherein a center portion of said substantially flat portion comprises a planar portion not formed into a curved face.

6. A lensed optical fiber as set forth in claim 4, wherein a width of said planar portion is at least 0.5 times a width of said substantially flat portion.

7. A lensed optical fiber as set forth in claim 5, wherein a diameter of said planar portion is at least 0.5 times a diameter of said substantially flat portion.

8. A process of production of a lensed optical fiber which comprises an optical fiber having a core and a cladding and a lens portion formed on a front end of the optical fiber, wherein the lens portion has a substantially flat portion formed at an end face of the core, slanting faces formed at an end face of the cladding, and convex curved faces including part of the core formed between the substantially flat portion and the slanting faces, said process comprising:

- a step A of forming a planar portion substantially perpendicular to a core center axis at the front end of the optical fiber,
- a step B of forming said slanting faces around said planar portion, and
- a step C of processing ridge portions of said planar portion and said slanting faces to form said convex curved faces, and polishing said planar portion to form said substantially flat portion.

9. A process of production of the lensed optical fiber as set forth in claim 8, wherein step A is a step of cleaving said optical fiber to form the planar portion, which comprises a cleaved face.

10. A process of production of the lensed optical fiber as set forth in claim 8, wherein step A is a step of polishing an end face of the optical fiber to form the planar portion.

11. A process of production of the lensed optical fiber as set forth in claim 8, wherein step B is a step of forming said slanting faces so that widths between the core and the ridges of said slanting faces at said planar portion become ⅓ to 3 times a diameter of the core.

12. A process of production of the lensed optical fiber as set forth in claim 8, wherein step B is a step of forming two slanting faces at two sides of said planar portion.

13. A process of production of the lensed optical fiber as set forth in claim 8, wherein step B is a step of polishing said optical fiber while turning said optical fiber about the core center axis.

14. A process of production of lensed optical fiber as set forth in claim 8, further comprising temporarily holding a plurality of optical fibers by inserting them into a holder formed with a row of a plurality of optical fiber holes and processing said plurality of optical fibers all together by at least one of said step A, said step B, and said step C.

15. A process of production of the lensed optical fiber as set forth in claim 8, further comprising temporarily holding a plurality of optical fibers by inserting them into a holder formed with a row of a plurality of optical fiber holes, processing them all together by said step A and said step B, and then processing the plurality of optical fibers one by one by said step C.

16. A process of production of the lensed optical fiber as set forth in claim 8, further comprising temporarily holding a plurality of optical fibers by inserting them into a holder formed with a row of a plurality of optical fiber holes and processing said plurality of optical fibers together with said holder by at least one of said step A, said step B, and said step C.

17. A process of production of the lensed optical fiber as set forth in claim 8, wherein at least one of said step B and said step C is a step of running a polishing tape and bringing said polishing tape into contact with a desired processing portion of said optical fiber.

18. A process of production of the lensed optical fiber as set forth in claim 8, wherein step C is a step of running a polishing tape abutting at a back surface against a back member having a groove and bringing said polishing tape into contact with the ridge portions between said planar portion and said slanting faces of said optical fiber.

19. A laser diode module comprising a laser diode and a lensed optical fiber optically coupled with said laser diode,

- wherein said lensed optical fiber comprises an optical fiber having a core and a cladding and a lens portion formed on a front end of the optical fiber,
- wherein the lens portion has a substantially flat portion formed at an end face of the core, slanting faces formed at an end face of the cladding, and convex curved faces including part of the core formed between the substantially flat portion and the slanting faces,
- wherein said substantially flat portion has a width and diameter each of which is 0.2 to 0.6 times a core diameter and each of which is at least 1 $\mu$m, and
- wherein said substantially flat portion has an average radius of curvature of at least 10 times a radii of curvature of said convex curved faces.

* * * * *